(12) United States Patent
Filho (10) Patent No.: US 7,072,320 B2
(45) Date of Patent: Jul. 4, 2006

(54) APPARATUS FOR SPREADING, SCRAMBLING AND CORRELATION IN A RECONFIGURABLE DIGITAL SIGNAL PROCESSOR

(75) Inventor: Eliseu M. Chaves Filho, Irvine, CA (US)

(73) Assignee: Morpho Technologies, Irvine, CA (US)

( * ) Notice: Subject to any disclaimer, the term of this patent is extended or adjusted under 35 U.S.C. 154(b) by 337 days.

(21) Appl. No.: 10/712,288

(22) Filed: Nov. 12, 2003

(65) Prior Publication Data

US 2005/0102340 A1    May 12, 2005

(51) Int. Cl.
*H04B 7/216*    (2006.01)
(52) U.S. Cl. ........................................ 370/335
(58) Field of Classification Search ............... None
See application file for complete search history.

(56) References Cited

U.S. PATENT DOCUMENTS 5,956,518 A * 9/1999 DeHon et al. ............... 712/15

6,448,910 B1    9/2002 Lu
6,967,999 B1 * 11/2005 Subramanian et al. ...... 375/224

OTHER PUBLICATIONS

Singh et al, MorphoSys: An Integrated Reconfigurable System for Data-Parallel and Computation-Intesive Applications, IEEE, pp. 465-481, May 2000.*
Lee et al, Design and Implementation of the MorphoSys Reconfigurable Computing Processor, Journal of VLSI Signal Processing Systems, pp. 1-38, 2000.*
Glosser et al., "A Software-Defined Communication Baseband Design", IEEE Communications Magazine, pp. 120-128, Jan. 2003.
Gunn et al., "A Low-Poer DSP Core-Based Software Radio Architecture", IEEE Journal On Selected Areas In Communications, vol. 17, No. 4, pp. 574-590, Apr. 4, 1999.

* cited by examiner

*Primary Examiner*—Frank Duong
(74) *Attorney, Agent, or Firm*—MacPherson Kwok Chen & Heid LLP; Tom Chen (57) ABSTRACT

A hardware unit within a DSP includes various circuits and components that allow spreading, complex scrambling, and complex correlation to be performed at the software level in a programmable processor at the speed levels required by third generation wireless communication systems.

21 Claims, 7 Drawing Sheets

APPARATUS FOR SPREADING, SCRAMBLING AND CORRELATION IN A RECONFIGURABLE DIGITAL SIGNAL PROCESSOR

FIELD OF THE INVENTION

The present invention relates to digital signal processors, and in particular, to digital signal processing on a chip.

DESCRIPTION OF RELATED ART

In digital wireless communication systems based on the Wideband CDMA (WCDMA) standard, the transmitter typically performs two operations on the incoming data stream. The first operation is channelization, whereby the data stream is modulated with a binary code sequence called the channelization code.

Channelization is actually a form of spreading: As the rate of the channelization code is higher than the data rate, the bandwidth of the channelized data stream is higher than the bandwidth of the original data stream. After channelization, the transmitter performs the second operation, complex scrambling, which modulates the channelized data stream with a complex-valued scrambling code. On the other side of the communication link, the receiver performs complex correlation operations in order to recover the transmitted data.

Spreading, complex scrambling, and complex correlation functions have been traditionally implemented by application-specific integrated circuits (ASICs), since software-level implementations on conventional digital signal processors (DSPs) cannot perform those operations with the required efficiency. However, hardware-level implementation requires the design of a complex ASIC device to handle the various parameters in the baseband processing, such as different oversampling factors, different sample bit widths, and different spreading factors. Furthermore, the need for ASICs increases the time-to-market, the complexity, and the cost of the system when compared to a software solution.

Accordingly, there is a need for a system that allows wireless baseband processing without the disadvantages discussed above with respect to conventional systems.

SUMMARY OF THE INVENTION

According to one aspect of the invention, a reconfigurable digital signal processor (DSP) includes a specialized functional hardware unit that enables spreading, complex scrambling, and complex correlation functions to be performed efficiently in software. In one embodiment, such a hardware unit is part of a Reconfigurable Cell (or RC), where a plurality of RCs are contained in the reconfigurable DSP. Software-level spreading and complex scrambling during transmitting and complex correlation during receiving are supported by the unit, thereby resulting in performance higher than previously possible on conventional DSPs and eliminating the need for ASICs. The hardware unit conforms the complex scrambling and complex correlation operations specified in the WCDMA standard. Consequently, wireless baseband processing can be performed with the throughput required by a widely-adopted third generation (3G) wireless communication system. It also supports spreading and correlation as specified in the second-generation IS-95 standard.

In one embodiment, the hardware unit is part of a so-called CDMA unit that receives two pairs of data bits, with each pair including in-phase and quadrature data bits. The CDMA unit comprises four blocks, each block receiving a data input and computing the negative value of the input. Four sets of multiplexers select either the input bits or the output of the blocks that calculate the negative of the input, based on the data stored in code registers. The output of the multiplexers are then selectively input to arithmetic circuits for addition and subtraction. Another set of arithmetic circuits subtracts and/or adds values, which can be concatenated, from the first set of multiplexers. A second set of multiplexers selects the outputs of either the first or second set of arithmetic circuits. The output of the second set of multiplexers can then be used by other parts of the DSP.

In one embodiment, the hardware unit performs WCDMA channelization by mapping the data bits into a sequence of complex-valued chips. The WCDMA scrambling process consists of modulating the complex-valued chip stream with a complex-valued scrambling code by multiplying the two quantities. The channelized and scrambled data can then be transmitted. In order to recover the transmitted data, the same hardware unit in the receiving reconfigurable DSP computes complex correlation functions between the received chip stream and locally-generated replicas of the same channelization and scrambling codes used by the transmitter.

By performing the spreading, complex scrambling, and complex correlation functions within the DSP, instead of using a separate ASIC, wireless baseband processing can be accomplished. Previously, these operations had to be performed completely in hardware, such as ASICs, with less flexibility and higher costs. The present invention, used with higher clock speeds found in deep sub-micron technologies, provides the necessary hardware support to perform the spreading, scrambling, and correlation functions at the software level.

The same hardware unit in the DSP is able to support spreading, complex scrambling, and complex correlation for multiple wireless communication systems, such as IS-95, WCDMA, and cdma2000. Further, this allows a single unit to provide the same capability of multiple conventional application-specific integrated circuits.

The present invention will be more fully understood upon consideration of the detailed description below, taken together with the accompanying drawings.

DETAILED DESCRIPTION OF THE PREFERRED EMBODIMENTS

Figure 1:
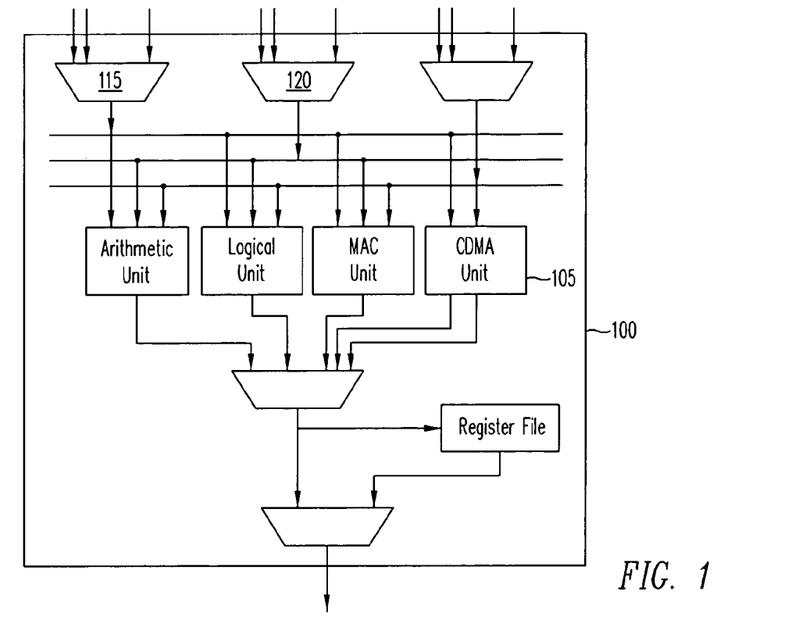
FIG. 1 shows a CDMA unit within a reconfigurable cell of a reconfigurable DSP, where the CDMA unit performs spreading, complex scrambling, and complex correlation according to one embodiment of the invention.

FIG. 1 shows a reconfigurable cell (RC) 100, which is part of a reconfigurable digital signal processor (rDSP). Numerous RCs form an RC array within the rDSP. RC 100 includes a CDMA (Code Division Multiple Access) unit 105. According to one embodiment of the invention, CDMA unit 105 performs spreading and complex scrambling at the transmitter and complex correlation at the receiver. These operations will be discussed in detail. CDMA unit 105 receives its input data from the RC input multiplexers 115 and 120, with each set selected from either the data bus or another RC. CDMA unit 105 then utilizes these signals for spreading, scrambling, and correlation. Multiplexer 115 receives signals from a data bus (not shown), neighboring or adjacent reconfigurable cells, and a register file. Similarly, multiplexer 120 receives signals from the data bus, neighboring or adjacent RCs, and the register file.

Spreading Operations

In the IS-95 standard, each data bit to be transmitted is mapped into a sequence of chips $s_n(t)$, with the number of chips per data bit being called a Spreading Factor (SF). The range of the SF is set forth in the IS-95 standard, and the specific SF selected is through software. The spreading operation can be expressed as follows:

$$s_n(t)=d(t)C(t) \quad 0 \leq n \leq SF-1 \qquad (1)$$

where $d(t)$ is the input data stream and $C(t)$ is the spreading code sequence, both in the domain $\{+1,-1\}$. The result of multiplying the data bit with the spreading code sequence is the chip sequence $s_n(t)$. The value +1 is mapped to binary value 0 and value −1 is mapped to binary value 1. In the domain $\{0,1\}$, the multiplication in equation (1) becomes a 1-bit modulo-2 addition, which can be implemented by a simple exclusive-or logic gate. Therefore, Equation (1) can be re-written as:

$$s_n(t)=d(t)(xor)C(t) \quad 0 \leq n \leq SF-1 \qquad (2)$$

where (xor) denotes the Boolean exclusive-or operator. For example, for a spreading factor of 8, correlation operations need to be performed 8 times.

Figure 2:
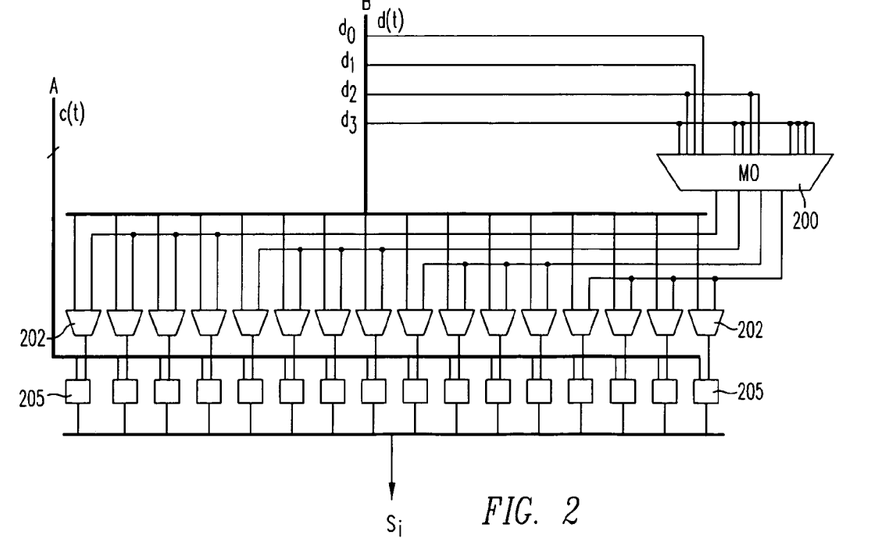
FIG. 2 shows a data path for implementing a spreading operation according to one embodiment of the invention.

FIG. 2 shows a data path that implements the spreading operation of equation (2) according to one embodiment. Inputs A and B receive the code sequence bits $C(t)$ and the data bits $d(t)$, respectively. Multiplexer 200 is a 4-bit 3-to-1 multiplexer. The three possible inputs are $\{d_0, d_1, d_2, d_3\}$, $\{d_0, d_0, d_1, d_1\}$, and $\{d_0, d_0, d_0, d_0\}$. The input set is selected depending on the spreading factor, as indicated in the table below:

| Input | Connected to data bits | Selected for Spread Factor |
| --- | --- | --- |
| 0 | $d_0, d_1, d_2, d_3$ | SF = 4 |
| 1 | $d_0, d_0, d_1, d_1$ | SF = 8 |
| 2 | $d_0, d_0, d_0, d_0$ | SF $\geq$ 16 |

In one embodiment, shown in FIG. 2, there are 16 sets of exclusive OR gates and multiplexers. So, if the SF is 4, four data bits can be accepted (i.e., 4×4). However, if the SF is 8, only two data bits can be used (i.e., 2×8).

When input 0 of multiplexer 200 is selected (for an SF of 4, i.e. 4 chips per data bit), each of four data bits $d_0, d_1, d_2, d_3$ is exclusive-ored (with two-input XOR gates 205) four times, each time with a different one of four different code bits from input A. When spreading is desired, data bits through multiplexer 200 are selected by 2-to-1 multiplexers 202, and when data bits are simply to be copied or passed through, multiplexers 202 select data bits from input B directly. As seen from FIG. 2, the result of the XOR operations on the four bits $d_0$ to $d_3$ and four code bits $C_0$ to $C_3$ produces a sequence of sixteen chips $s_i$ as follows:

$$s_i=d_0(xor)C_0 \text{ for } 0 \leq i \leq 3$$

$$s_i=d_1(xor)C_1 \text{ for } 4 \leq i \leq 7$$

$$s_i=d_2(xor)C_2 \text{ for } 8 \leq i \leq 11$$

$$s_i=d_3(xor)C_3 \text{ for } 12 \leq i \leq 15$$

When input 1 of multiplexer 200 is selected (for an SF of 8, i.e. 8 chips per data bit), each of the two data bits $d_0$ and $d_1$ are exclusive-ored eight times with two different code bits $C_0$ and $C_1$, resulting in the following sixteen chips:

$$s_i=d_0(xor)C_0 \text{ for } 0 \leq i \leq 7$$

$$s_i=d_1(xor)C_1 \text{ for } 8 \leq i \leq 15$$

When input 2 is of multiplexer 200 selected (for an SF of 16 or more, i.e., 16 or more chips per data bit), the single data bit $d_0$ is exclusive-ored sixteen times with the same code bit $C_0$, producing the following sixteen chips:

$$s_i=d_0(xor)C_0 \text{ for } 0 \leq i \leq 15$$

The resulting sequence of chips $s_i$ from the series of multiplexers 205 is then used for subsequent scrambling operations, also performed by CDMA unit 115 of FIG. 1. However, scrambling operations are performed in a different block than the spreading operations. Referring to FIG. 1, the results of scrambling are stored in registers 135, which are then transferred back to the CDMA unit for subsequent processing for scrambling.

Channelization and Complex Scrambling Operations

In the WCDMA channelization, the input data bits are mapped to a complex-valued chip stream obtained from the two real-valued chip streams:

$$I(t)=d_I(t)C_I(t) \text{ and}$$

$$Q(t)=d_Q(t)C_Q(t)$$

where $d_I$ and $d_Q$ are data bits, and $C_I(t)$ and $C_Q(t)$ are the channelization codes that assume values in the domain $\{+1,-1\}$. For WCDMA downlink, $C_I(t)$ is equal to $C_Q(t)$. The input complex chip stream is therefore:

$$I(t)+jQ(t)=s_{I,n}(t)+js_{Q,n}(t)=[d_I(t)C_I(t)]+j[d_Q(t)C_Q(t)] \qquad (3)$$

where I and Q represent the in-phase and quadrature components, respectively.

Scrambling is done by multiplying the complex chip stream $I(t)+jQ(t)$ by the complex scrambling code sequence $S_I(t)+jS_Q(t)$, where $S_I(t)$ and $S_Q(t)$ are the components of the complex scrambling code and assume values in the domain $\{+1,-1\}$. The result is the scrambled complex chip sequence $Y_I(t)+jY_Q(t)$ given in equation (4) below:

$$Y_I(t)+jY_Q(t)=[I(t)+jQ(t)]\times[S_I(t)+jS_Q(t)]=[I(t)S_I(t)-Q(t)S_Q(t)]+j[I(t)S_Q(t)+Q(t)S_I(t)]=[d_I(t)C_I(t)S_I(t)-d_Q(t)C_Q(t)S_Q(t)]+j[d_I(t)C_I(t)S_Q(t)+d_Q(t)C_Q(t)S_I(t)] \quad (4)$$

Figure 3:
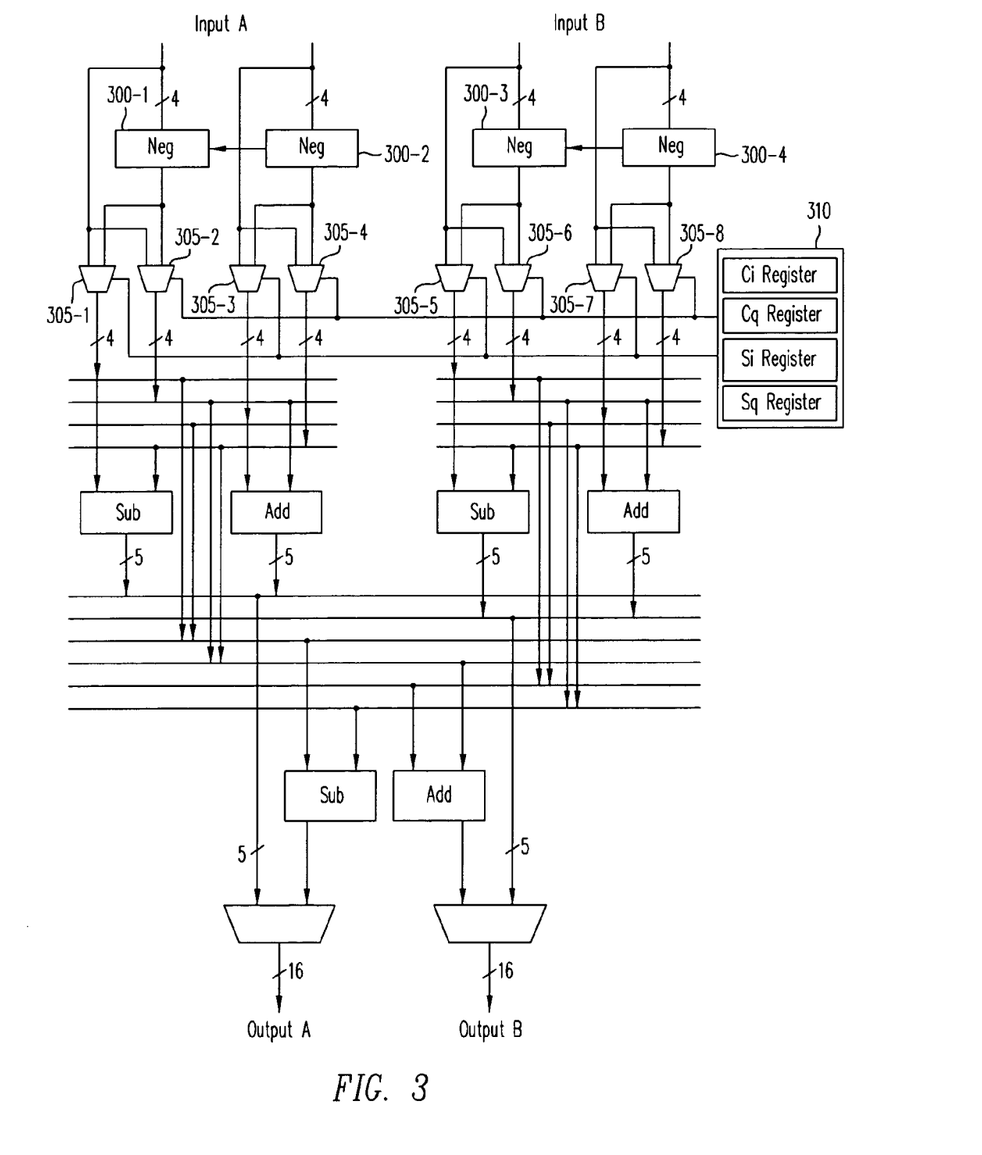
FIG. 3 shows a data path for implementing a scrambling operation according to one embodiment of the invention.

FIG. 3 shows the data path, with corresponding hardware elements, that implements the scrambling operation given in equation (4) within CDMA unit 105 according to one embodiment of the invention. In the 4-bit format, both $d_I(t)$ and $d_Q(t)$ are 4-bit signed numbers in 2's complement representation. Each input A and B receives a pair of values ($d_I(t)$, $d_Q(t)$). In the 8-bit format, both $d_I(t)$ and $d_Q(t)$ are 8-bit 2's complement signed numbers. In this case, input A receives $d_I(t)$ and input B receives $d_Q(t)$.

The data path of FIG. 3 includes blocks 300 labeled Neg, which compute the negative values of the input data. Neg blocks can be any circuit that receives an input and outputs the negative of the input, such as an inverter. In the case of 4-bit format, the four Neg blocks 300-1 to 300-4 calculate the negative value of the two input data pairs ($d_I(t)$, $d_Q(t)$). In the case of 8-bit format, the two Neg blocks on the left 300-1 and 300-2 calculate the negative value of $d_I(t)$ and the two blocks on right 300-3 and 300-4 compute the negative value of $d_Q(t)$. Multiplexers 305 coupled to the output of Neg blocks 300 and to inputs A or B select either the input data or the output of a Neg block 300. The input is selected based on the most significant bit of the binary code sequences stored in a register file 310, which includes in-phase code registers (Ci and Si) and quadrature code registers (Cq and Sq). If the most significant bit of the in-phase and quadrature registers is 0, then multiplexers 305 select the input data. Since bit 0 is mapped to value +1, this corresponds to multiplying the input data by 1. If the most significant bit of the registers is 1, then multiplexers 305 select the output of the Neg block. Because bit 1 is mapped to value −1, the operation of the Neg block and the multiplexer is equivalent to multiplying the input data by −1. Processing after the outputs of multiplexers 305 will now be described for 4-bit and 8-bit complex scrambling.

Figure 4:
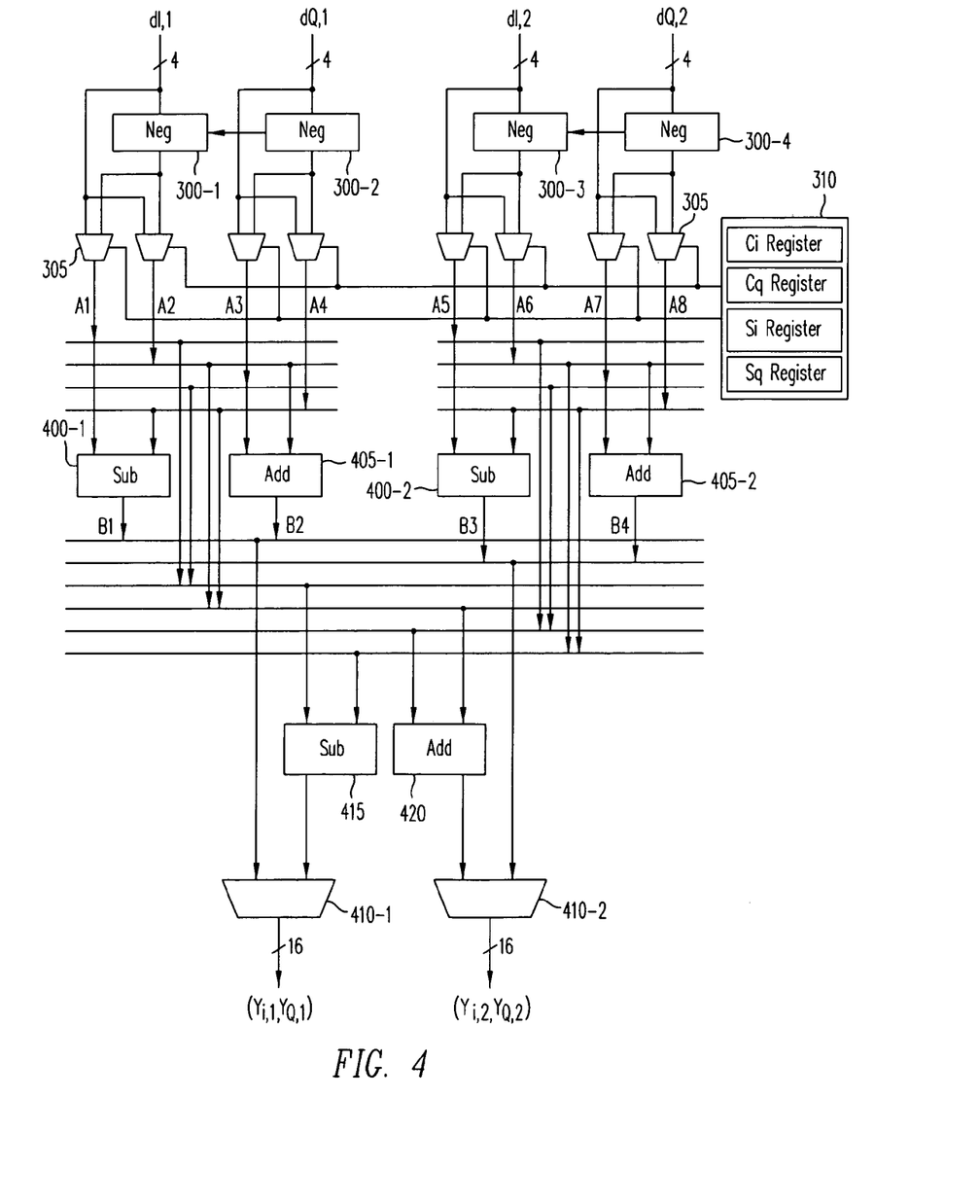
FIG. 4 shows the data flow for a 4-bit complex scrambling operation according to one embodiment of the invention.

FIG. 4 shows the data flow for 4-bit complex scrambling. Given two input data pairs ($d_{I,1}, d_{Q,1}$) and ($d_{I,2}, d_{Q,2}$), the following values are present for signals at A1 to A8 of the data path (at the outputs of multiplexers 305) indicated in FIG. 4:

$A1=d_{I,1}C_I S_{I,n}$ $A2=d_{I,1}C_I S_{Q,n}$ $A3=d_{Q,1}C_Q S_{I,n}$ $A4=d_{Q,1}C_Q S_{Q,n}$ $A5=d_{I,2}C_I S_{I,n+1}$ $A6=d_{I,2}C_I S_{Q,n+1}$ $A7=d_{Q,2}C_Q S_{I,n+1}$ $A8=d_{Q,2}C_Q S_{Q,n+1}$ where $S_{I,n}$ and $S_{Q,n}$ are the nth bit of the code sequences $S_I$ and $S_Q$, respectively. As described above, the code bits from register file 310 act as control signals to the multiplexers 305, such that those bits act to determine, in effect, whether the sign of the input data is reversed or remains unchanged.

Signals at B1 to B4, which are the output of subtractors 400 and adders 405, are given as follows:

$B1=A1-A4=d_{I,1}C_I S_{I,n}-d_{Q,1}C_Q S_{Q,n}$ $B2=A2+A3=d_{I,1}C_I S_{Q,n}+d_{Q,1}C_Q S_{I,n}$ $B3=A5-A8=d_{I,2}C_I S_{I,n+1}-d_{Q,2}C_Q S_{Q,n+1}$ $B4=A6+A7=d_{I,1}C_I S_{Q,n+1}-d_{Q,2}C_Q S_{I,n+1}$

Output signals $Y_I(t)$ and $Y_Q(t)$ from 3-to-1 multiplexers 410 provide two pairs ($Y_{I,1}, Y_{Q,1}$) and ($Y_{I,2}, Y_{Q,2}$) as follows:

$Y_{I,1}(t)=B1=d_{I,1}C_I S_{I,n}-d_{Q,1}C_Q S_{Q,n}$ or $Y_{I,2}(t)=B3=d_{I,2}C_I S_{I,n+1}-d_{Q,2}C_Q S_{Q,n+1}$ $Y_{Q,1}(t)=B2=d_{I,1}C_I S_{Q,n}+d_{Q,1}C_Q S_{I,n}$ or $Y_{Q,2}(t)=B4=d_{I,2}C_I S_{Q,n+1}+d_{Q,2}C_Q S_{I,n+1}$

The output pairs ($Y_{I,1}, Y_{Q,1}$) and ($Y_{I,2}, Y_{Q,2}$), which have been scrambled, can then be used by other parts of the reconfigurable cell and transmitted to an intended receiver.

When CDMA unit 105 is performing a 4-bit complex scrambling operation, only the B1 or B3 inputs for multiplexer 410-1 and the B2 or B4 inputs for multiplexer 410-2 are used. The third input, the output from subtractor 415 and adder 420, is used when an 8-bit complex scrambling operation is performed, as will be discussed.

Figure 5:
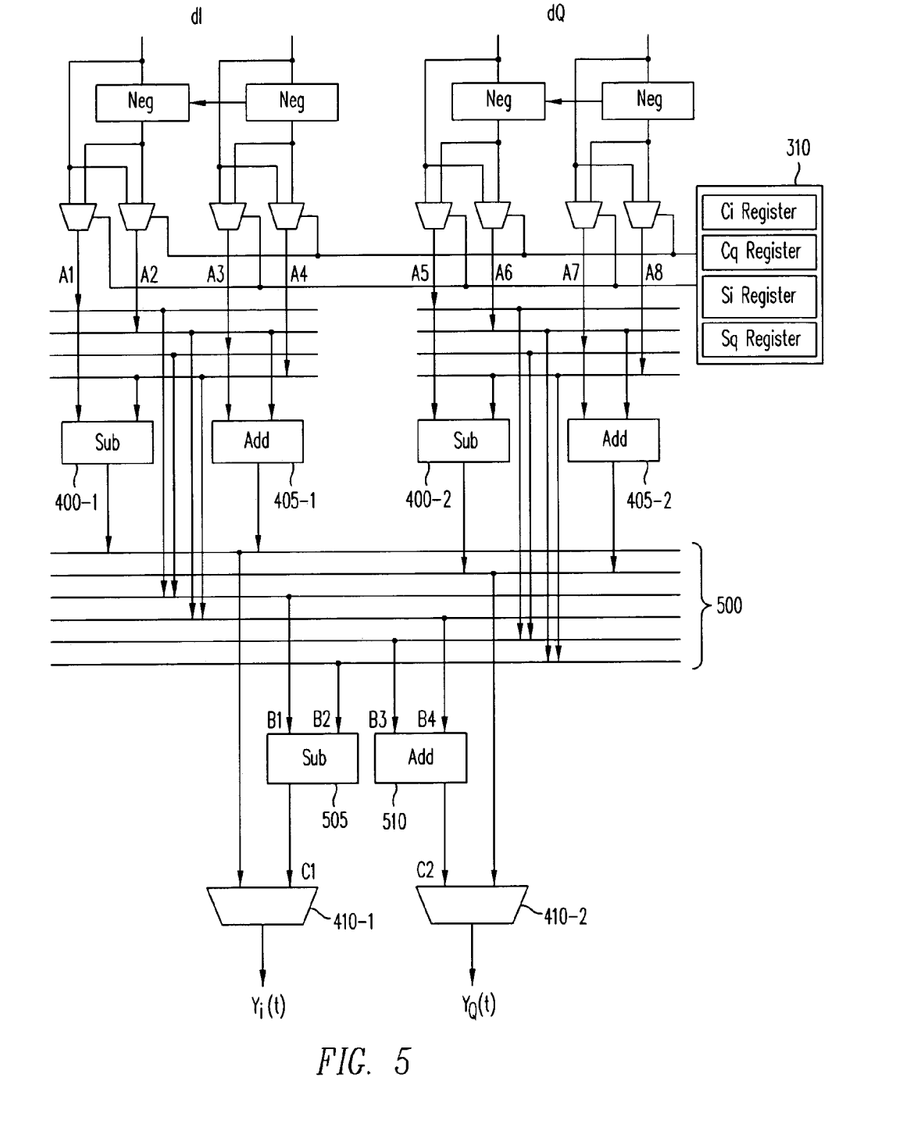
FIG. 5 shows the data flow for an 8-bit complex scrambling operation according to one embodiment of the invention.

FIG. 5 shows the data flow in the case of 8-bit format complex scrambling. The following values are present for signals at points A1 to A8 of the data path indicated in FIG. 5:

$A1A3=d_I C_I S_{I,n}$ $A2A4=d_I C_I S_{Q,n}$ $A5A7=d_Q C_Q S_{I,n}$ $A6A8=d_Q C_Q S_{Q,n}$

The notation AiAk represents a concatenation of two four bit signals A for an 8-bit representation for 8-bit scrambling operations. The signals bypass the arithmetic circuits (subtractors 400 and adders 405) and are placed onto buses 500 or other suitable signal carrying medium. These signals at points B1 to B4 are given as follows:

$B1=A1A3=d_I C_I S_{I,n}$ $B2=A6A8=d_Q C_Q S_{Q,n}$ $B3=A5A5=d_Q C_Q S_{I,n}$ $B4=A2A4=d_I C_I S_{Q,n}$

Signals at B1 and B2 are then input into a subtractor circuit 505, while signals at points B3 and B4 are input to an adder circuit 510. The output signals of subtractor 505 and the output of adder 510 are given at points C1 and C2, respectively, as follows:

$C1=B1-B2=d_I C_I S_{I,n}-d_Q C_Q S_{Q,n}$ $C2=B3+B4=d_Q C_Q S_{I,n}+d_I C_I S_{Q,n}$

Multiplexer 410-1 selects the output of subtractor 505 for the output signal $Y_I$, while multiplexer 410-2 selects the output of adder 510 for the output signal $Y_Q$. Outputs $Y_I(t)$ and $Y_Q(t)$ are given as follows:

$Y_I(t)=d_I C_I S_{I,n}-d_Q C_Q S_{Q,n}$ $Y_Q(t)=d_I C_I S_{Q,n}+d_Q C_Q S_{I,n}$

These channelized and scrambled data signals are then transmitted or further processed in other portions of CDMA unit 115. Note that scrambling and correlation operations are performed in the same block, while the spreading operation is performed within a different block of CDMA unit 105.

Correlation Operations

Channelized and scrambled data signals are received by CDMA unit 105. In order to recover the original information, the receiver-computes complex correlation functions between the received chip stream and locally-generated replicas of the same channelization and scrambling codes used by the transmitter. The discrete-time, complex domain correlation function between two code sequences:

$$\sigma_1(n) = \sigma_{I,1}(n) + j\sigma_{Q,1}(n) \text{ and}$$

$$\sigma_2(n-\tau) = \sigma_{I,2}(n-\tau) + j\sigma_{Q,2}(n-\tau)$$

is given as follows:

$$R_c(\tau) = \Sigma_p [\sigma_{I,1}(n) + j\sigma_{Q,1}(n)][\sigma_{I,2}(n-\tau) - j\sigma_{Q,2}(n-\tau)] \quad (5)$$

where P is the period of the two sequences and $\tau$ is the phase shift between the two sequences. If the two code sequences are in phase (i.e., $\tau=0$), code sequences $\sigma_1(n) = \sigma_{I,1}(n) + j\sigma_{Q,1}(n)$ and $\sigma_2(n) = \sigma_{I,2}(n) + j\sigma_{Q,2}(n)$ are orthogonal and normalized if they exhibit the following two properties:

$$\Sigma_p [\sigma_{I,1}(n) + j\sigma_{Q,1}(n)][\sigma_{I,2}(n) - j\sigma_{Q,2}(n)] = 0, \text{ and} \quad (6a)$$

$$\Sigma_p [\sigma_{I,1}(n) + j\sigma_{Q,1}(n)][\sigma_{I,1}(n) - j\sigma_{Q,1}(n)] = \Sigma_p [\sigma_{I,2}(n) + j\sigma_{Q,2}(n)][\sigma_{I,2}(n) - j\sigma_{Q,2}(n)] = 1 \quad (6b)$$

The transmitted signal $Y_I(t) + jY_Q(t)$ is given by equation (4) above. This complex chip stream arrives at the receiver as signal $R_I(t) + jR_Q(t)$ (the same as the transmitted signal $Y_I(t) + jY_Q(t)$), given as follows:

$$R_I(t) + jR_Q(t) = [d_I(t)C_I(t)S_I(t) - d_Q(t)C_Q(t)S_Q(t)] + j[d_I(t)C_I(t)S_Q(t) + d_Q(t)C_Q(t)S_I(t)] \quad (7)$$

To recover the data $d_I(t)$ according to one embodiment, the receiver computes the complex correlation function between the received chip stream and the complex code sequence $C_I(t)S_I(t) - jC_I(t)S_Q(t)$.

The correlation for recovering $d_I(t)$ from the received scrambled signal is given as follows:

$$\Sigma[R_I(t) + jR_Q(t)] \times [C_I(t)S_I(t) - jC_I(t)S_Q(t)] = \Sigma[R_I(t)C_I(t)S_I(t) - jR_I(t)C_I(t)S_Q(t) + jR_Q(t)C_I(t)S_I(t) + R_Q(t)C_I(t)S_Q(t)] = \Sigma[R_I(t)C_I(t)S_I(t) + R_Q(t)C_I(t)S_Q(t)] + j[R_Q(t)C_I(t)S_I(t) - R_I(t)C_I(t)S_Q(t)] = \Sigma[R_I(t)C_I(t)S_I(t) + \Sigma R_Q(t)C_I(t)S_Q(t) + j[\Sigma R_Q(t)C_I(t)S_I(t) - \Sigma R_I(t)C_I(t)S_Q(t)] \quad (8)$$

Replacing $R_I(t)$ and $R_Q(t)$ from equation (7) in each of the terms of equation (8), the following set of equations are obtained:

$$\Sigma R_I(t)C_I(t)S_I(t) = \Sigma d_I(t)C_I(t)S_I(t)C_I(t)S_I(t) - \Sigma d_Q(t)C_Q(t)S_Q(t)C_I(t)S_I(t) \quad (9a)$$

$$\Sigma R_Q(t)C_I(t)S_Q(t) = \Sigma d_I(t)C_I(t)S_Q(t)C_I(t)S_Q(t) + \Sigma d_Q(t)C_Q(t)S_I(t)C_I(t)S_Q(t) \quad (9b)$$

$$\Sigma R_Q(t)C_I(t)S_I(t) = \Sigma d_I(t)C_I(t)S_Q(t)C_I(t)S_I(t) + \Sigma d_Q(t)C_Q(t)S_I(t)C_I(t)S_I(t) \quad (9c)$$

$$\Sigma R_I(t)C_I(t)S_Q(t) = \Sigma d_I(t)C_I(t)S_I(t)C_I(t)S_Q(t) - \Sigma d_Q(t)C_Q(t)S_Q(t)C_I(t)S_Q(t) \quad (9d)$$

The components $C_I(t)$ and $C_Q(t)$ of the channelization code, as well as $S_I(t)$ and $S_Q(t)$ of the complex scrambling code, are orthogonal. Therefore, applying properties (6a) and (6b) to the set of equations above and noting that $C_I(t)$ is normalized (i.e., $C_I(t) \times C_I(t) = 1$), equations (9a) to (9d) reduce to the following:

$$\Sigma R_I(t)C_I(t)S_I(t) = d_I(t) \quad (10a)$$

$$\Sigma R_Q(t)C_I(t)S_Q(t) = d_I(t) \quad (10b)$$

$$\Sigma R_Q(t)C_I(t)S_I(t) = 0 \quad (10c)$$

$$\Sigma R_I(t)C_I(t)S_Q(t) = 0 \quad (10d)$$

Replacing equations (10a) to (10d) into equation (8) results in the following correlation:

$$\Sigma[R_I(t) + jR_Q(t)] \times [C_I(t)S_I(t) - jC_I(t)S_Q(t)] = 2d_I(t) \quad (11)$$

where $d_I(t)$ is the original information data stream.

Figure 6:
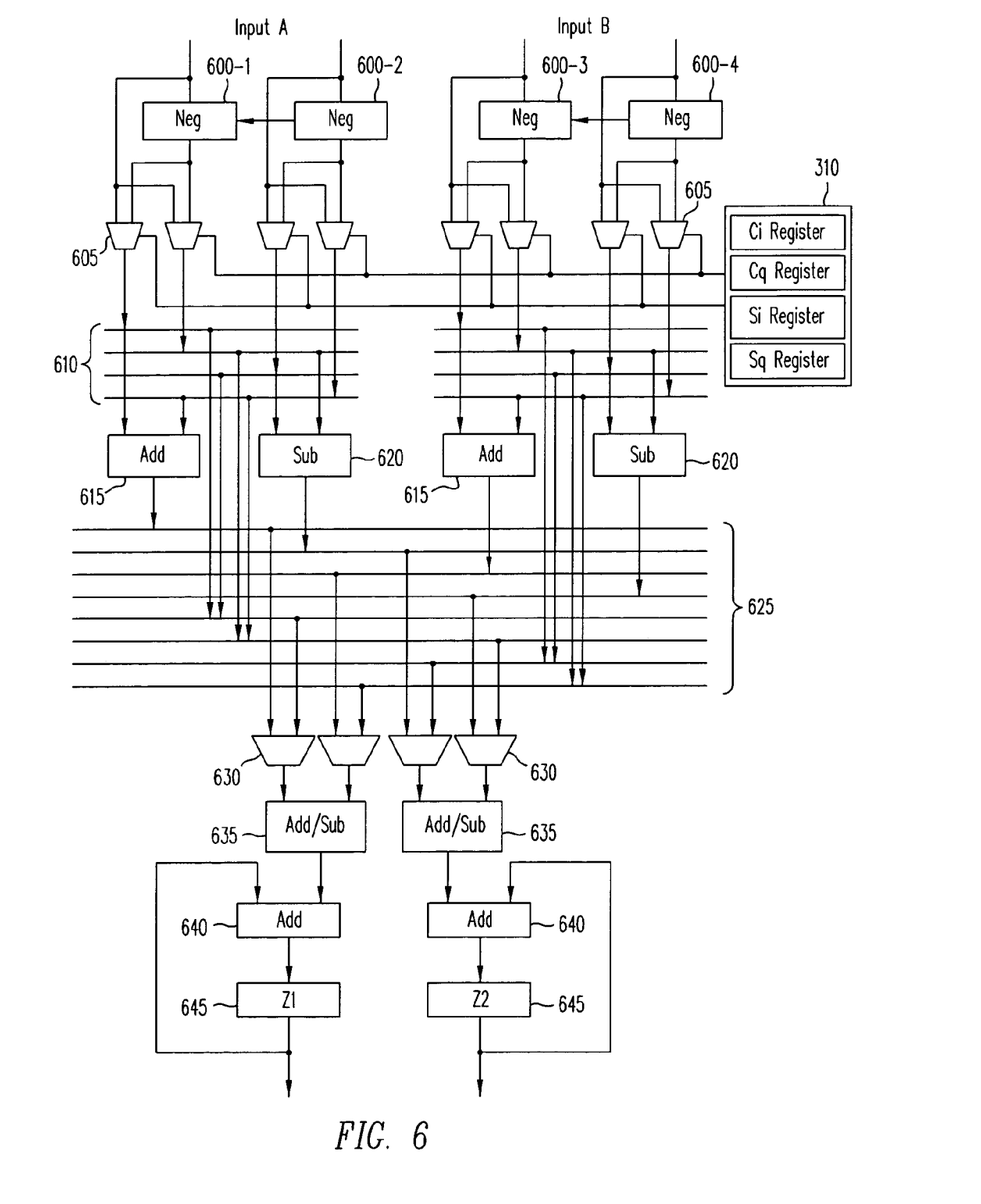
FIG. 6 shows a data path for implementing a correlation operation according to one embodiment of the invention.

To recover the data $d_Q(t)$ from the received signal, the receiver computes the complex correlation function between the received chip stream and the complex code sequence $C_Q(t)S_I(t) - jC_Q(t)S_Q(t)$. Thus, similar to $d_I(t)$, the correlation is given as follows:

$$\Sigma[R_I(t) + jR_Q(t)] \times [C_Q(t)S_I(t) - jC_Q(t)S_Q(t)] = \Sigma[R_I(t)C_Q(t)S_I(t) - jR_I(t)C_Q(t)S_Q(t) + jR_Q(t)C_Q(t)S_I(t) + R_Q(t)C_Q(t)S_Q(t)] = \Sigma[R_I(t)C_Q(t)S_I(t) + R_Q(t)C_Q(t)S_Q(t)] + j[R_Q(t)C_Q(t)S_I(t) - R_I(t)C_Q(t)S_Q(t)] = \Sigma[R_I(t)C_Q(t)S_I(t) + \Sigma R_Q(t)C_Q(t)S_Q(t) + j[\Sigma R_Q(t)C_Q(t)S_I(t) - \Sigma R_I(t)C_Q(t)S_Q(t)] \quad (12)$$

which reduces to the following:

$$\Sigma[R_I(t) + jR_Q(t)] \times [C_Q(t)S_I(t) - jC_Q(t)S_Q(t)] = 2d_Q(t) \quad (13)$$

where $d_Q(t)$ is the original information data stream. FIG. 6 shows the data path which implements the correlation operation as given by equation (8), according to one embodiment. The input is the received chip sequence $R_I(t) + jR_Q(t)$. Neg blocks 600 calculate the negative of its associated input. Internal register file 310 store the replicas of the channelization and scrambling codes of the receiver. Eight 2-1 multiplexers 605 select either the input data or the output of a Neg block 600, depending on the most significant bit of the code sequences stored in the code registers. The output of multiplexers 605 are coupled to arithmetic circuits., such as adders 615 and subtractors 620, via buses 610 or other suitable signal carrying medium. The output of adders 615 and subtractors 620, along with the outputs of multiplexers 605, are coupled to inputs of 2-1 multiplexers 630 via buses 625 or other suitable medium. The output of multiplexers 630 are input to adder/subtractor circuits 635. The outputs of adder/subtractor circuit 635 are accumulated by adders 640 with a feedback signal from register blocks 645. Register blocks 645 hold intermediate results and feed those results back to adders 640 to obtain the desired output from adders 640. The output of register blocks 645 is then transmitted to multiplexers 410 (see FIG. 4) for subsequent processing out of CDMA unit 105 (see FIG. 1).

Figure 7:
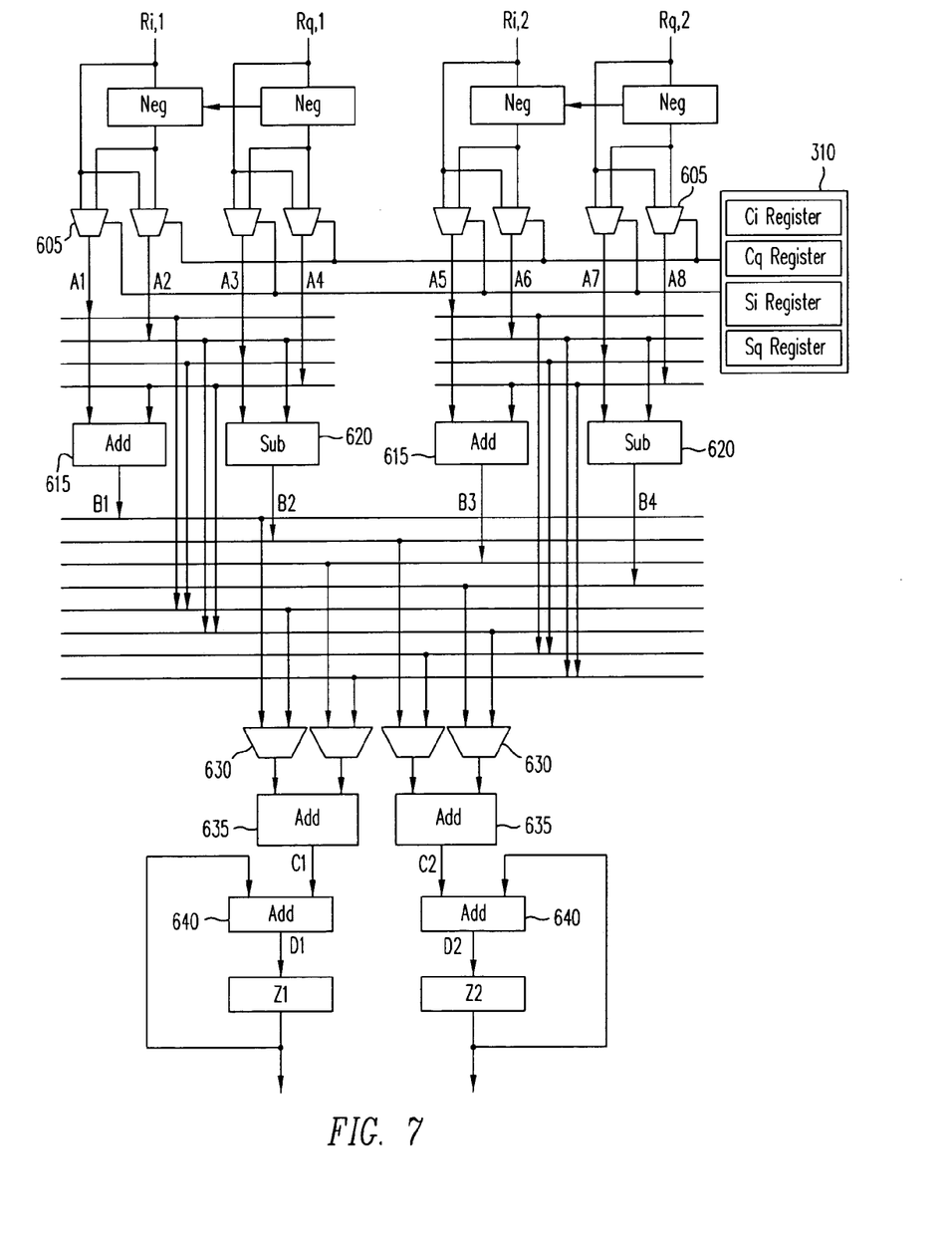
FIG. 7 shows the data flow for a 4-bit correlation operation according to one embodiment of the invention.

FIG. 7 shows the data flow for the 4-bit correlation case. In the 4-bit format, $R_I(t)$ and $R_Q(t)$ are 4-bit 2's-complement signed numbers and inputs A and B receive the pairs ($R_{I,1}$, $R_{Q,1}$) and ($R_{I,2}$, $R_{Q,2}$), respectively. In the case of 4-bit format, the four Neg 600 blocks calculate the negative of the two ($R_I(t)$, $R_Q(t)$) input data pairs. Signals at the output of multiplexers (at points A1 to A8 of the data path) are given below. In the following development, $C_n$ and $C_{n+1}$ can be either a $C_i$ or a $C_q$ code, depending on whether $d_I$ or $d_Q$, respectively, is being recovered.

$$A1 = R_{I,1} C_n S_{I,n}$$

$$A2 = R_{I,1} C_n S_{Q,n}$$

$$A3 = R_{Q,1} C_n S_{I,n}$$

$$A4 = R_{Q,1}C_n S_{Q,n}$$

$$A5 = R_{I,1}C_{n+1}S_{I,n+1}$$

$$A6 = R_{I,2}C_{n+1}S_{Q,n+1}$$

$$A7 = R_{Q,2}C_{n+1}S_{Q,n+1}$$

$$A8 = R_{Q,2}C_{n+1}S_{Q,n+1}$$

The signals at the output of adders 615 and subtractors 620 (at points B1 to B4) are as follows:

$$B1 = A1 + A4 = R_{I,1}C_n S_{I,n} + R_{Q,1}C_n S_{Q,n}$$

$$B2 = A3 + A2 = R_{Q,1}C_n S_{I,n} - R_{I,1}C_n S_{Q,n}$$

$$B3 = A5 + A8 = R_{I,2}C_{n+1}S_{I,n+1} + R_{Q,2}C_{Q,n+1}S_{Q,n+1}$$

$$B4 = A7 + A6 = R_{Q,2}C_{n+1}S_{I,n+1} - R_{I,1}C_{n+1}S_{Q,n+1}$$

For the 4-bit correlation, circuits 635 add two inputs provided by multiplexers 630. The output signals, at points C1 and C2, are given as follows:

$$C1 = B1 + B3 = (R_{I,1}C_n S_{I,n} + R_{Q,1}C_n S_{Q,n}) + (R_{I,2}C_{n+1}S_{I,n+1} + R_{Q,2}C_{n+1}S_{Q,n+1})$$

$$C2 = B2 + B4 = (R_{Q,1}C_n S_{I,n} - R_{I,1}C_n S_{Q,n}) + (R_{Q,2}C_{n+1}S_{I,n+1} - R_{I,2}C_{n+1}S_{Q,n+1})$$

The output of adders 640 at points D1 and D2 are then given as:

$$D1 = Z_1(n) = C_1 + \Sigma(R_{I,1}C_k S_{I,k} + R_{Q,1}C_k S_{Q,k}) = (R_{I,1}C_n S_{I,n} + R_{Q,1}C_n S_{Q,n}) + (R_{I,2}C_{n+1}S_{I,n+1} + R_{Q,2}C_{n+1}S_{Q,n+1}) + \Sigma(R_{I,1}C_k S_{I,k} + R_{Q,1}C_k S_{Q,k}) \quad k<n$$

$$D2 = Z_2(n) = C_2 + \Sigma(R_{Q,1}C_k S_{I,k} - R_{I,1}C_k S_{Q,k}) = (R_{Q,1}C_n S_{I,n} - R_{I,1}C_n S_{Q,n}) + (R_{Q,2}C_n S_{I,n+1} - R_{I,2}C_n S_{Q,n+1}) + \Sigma(R_{Q,1}C_k S_{I,k} - R_{I,1}C_k S_{Q,k}) \quad k<n$$

where D1 and D2 are transmitted to multiplexers 410.

Figure 8:
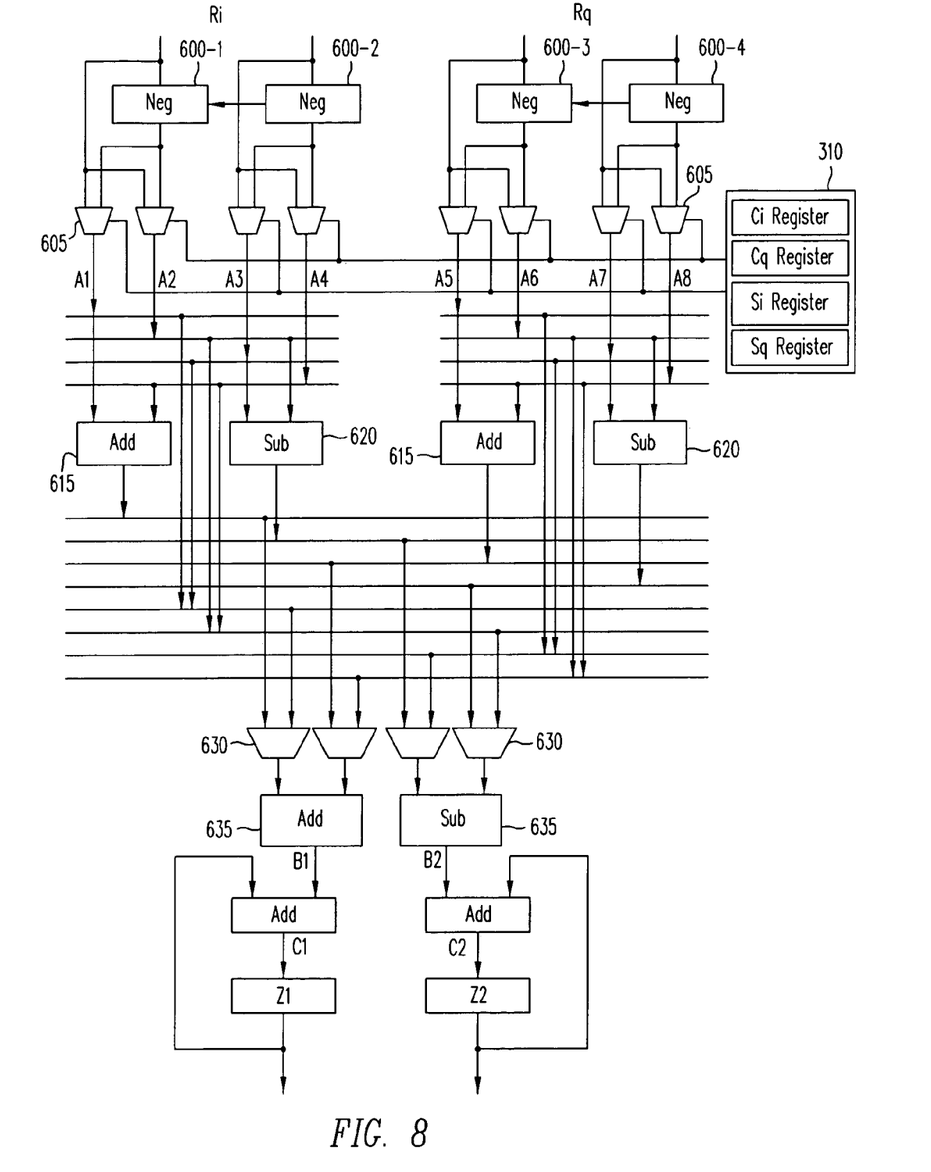
FIG. 8 shows the data flow for the 8-bit complex correlation operation according to one embodiment of the present invention.

FIG. 8 shows the data flow for the 8-bit correlation case. In the 8-bit format, both $R_I(t)$ and $R_Q(t)$ are 8-bit 2's-complement signed numbers. Inputs A and B receive $R_I(t)$ and $R_Q(t)$ data, respectively. For the 8-bit format, the two Neg blocks 600-1 and 600-2 on the left calculate the negative of $R_I(t)$ whereas the two Neg blocks 600-3 and 600-4 on right compute the negative of $R_Q(t)$. The output of multiplexers 605 (at points A1 to A8 of the data path) are given as follows:

$$A1A3 = R_I C_n S_{I,n}$$

$$A2A4 = R_I C_n S_{Q,n}$$

$$A5A7 = R_Q C_n S_{I,n}$$

$$A6A8 = R_Q C_n S_{Q,n}$$

where $C_n$ can be either $C_i$ or $C_q$, depending on whether $d_i$ or $d_q$, respectively, is being recovered. Again, the notation AiAk is a concatenation of the two 4-bit signals Ai and Ak. In the 8-bit processing, signals from multiplexers 605 bypass adders 615 and subtractors 620 and are then selected by multiplexers 630 for input to circuits 635 for appropriate adding or subtracting. The signal at point B1 (sum) and the signal at point B2 (difference) are given as follows:

$$B1 = A1A3 + A6A8 = R_I C_n S_{I,n} + R_Q C_n S_{Q,n}$$

$$B2 = A5A7 + A2A4 = R_Q C_n S_{I,n} - R_I C_n S_{Q,n}$$

The output of circuits 635 is then summed with a feedback signal, resulting in the following signals at points C1 and C2:

$$C1 = Z_1(n) = B1 + \Sigma(R_I C_k S_{I,k} + R_Q C_k S_{Q,k}) = (R_I C_n S_{I,n} + R_Q C_n S_{Q,n}) + \Sigma(R_I C_k S_{I,k} + R_Q C_k S_{Q,k}) \quad k<n$$

$$C2 = Z_2(n) = B2 + \Sigma(R_Q C_k S_{I,k} - R_I C_k S_{Q,k}) = (R_Q C_n S_{I,n} - R_I C_n S_{Q,n}) + \Sigma(R_Q C_k S_{I,k} - R_I C_k S_{Q,k}) \quad k<n$$

where signals at C1 and C2 are transmitted to multiplexers 410.

Note that the implementations shown in FIGS. 3 through 8 are all performed with a single design. The various implementations are shown with simplified connections for ease of illustration.

Although the invention has been described with reference to particular embodiments, the description is only an example of the invention's application and should not be taken as a limitation. For example, the data paths and description focused on IS-95 and WCDMA; however, other systems may also be used, such as cdma2000. Consequently, various adaptations and combinations of features of the embodiments disclosed are within the scope of the invention as defined by the following claims.

I claim:

1. A hardware unit within a digital signal processor (DSP), comprising:
    four polarity circuits, each configured to receive an input value and calculate a negative of the input value;
    four sets of multiplexers, each set comprising two multiplexers, wherein each of the multiplexers in each set receives a corresponding input signal and a corresponding output signal from one of the four polarity circuits;
    a code register coupled to each of the multiplexers, wherein code bits within the code register determine which input the multiplexers select;
    four first arithmetic circuits selectively coupled to receive signals from the multiplexers;
    two second arithmetic circuits selectively coupled to receive signals from the multiplexers; and
    two second multiplexers, each configured to receive an output signal from one of the second arithmetic circuits and an output signal from the first arithmetic circuits.

2. The hardware unit of claim 1, further comprising a bus coupled between the multiplexers and the first arithmetic circuits.

3. The hardware unit of claim 1, wherein the code register comprises in-phase and quadrature code registers.

4. The hardware unit of claim 1, wherein the input signal comprises in-phase and quadrature data bit signals.

5. The hardware unit of claim 1, wherein the hardware unit performs complex scrambling and complex correlation functions.

6. The hardware unit of claim 5, wherein the hardware unit further performs spreading operations.

7. The hardware unit of claim 5, wherein the hardware unit supports IS-95 and WCDMA.

8. The hardware unit of claim 7, wherein the hardware unit further supports cdma2000.

9. The hardware unit of claim 1, further comprising a second hardware unit comprising:
    a first multiplexer configured to receive data bits;
    a set of 2-to-1 multiplexers configured to receive the data bits and the output of the first multiplexer; and
    a set of logic gates configured to receive code sequence bits and the output of the 2-to-1 multiplexers.

10. The hardware unit of claim 9, wherein the logic gates are exclusive-OR gates.

11. The hardware unit of claim 9, wherein the second hardware unit performs spreading operations for IS-95.

12. The hardware unit of claim 9, wherein the first multiplexer is a 4-bit 3-to-1 multiplexer.

13. The hardware unit of claim 9, wherein the set is equal 16.

14. The hardware unit of claim 4, wherein the input signal is in a 4-bit format.

15. The hardware unit of claim 4, wherein the input signal is in a 8-bit format.

16. The hardware unit of claim 1, wherein the most significant bits of the code register determine which input the multiplexers select.

17. The hardware unit of claim 1, wherein the second arithmetic circuits are configured to receive concatenated signals from the four sets of multiplexers.

18. The hardware unit of claim 1, wherein the four sets of multiplexers are 2-to-1 multiplexers.

19. The hardware unit of claim 1, further comprising four second multiplexers, each configured to receive signals from the multiplexers and the first arithmetic circuits and coupled to one of the second arithmetic circuits.

20. The hardware unit of claim 19, further comprising two third arithmetic circuits configured to receive the output signals from the second arithmetic circuits and two registers configured to receive the output signals from the third arithmetic circuits, wherein each register is coupled to an input of one of the third arithmetic circuits.

21. A hardware unit within a CDMA unit within a digital signal processor (DSP), the hardware unit y comprising:

means for calculating the negative of an input signal;

2-to-1 multiplexers coupled to the means for calculating, wherein each of the multiplexers selects either the input signal or the negative of the input signal;

a code register coupled to each of the multiplexers, wherein code bits within the code register determine which input the multiplexers select;

first arithmetic circuits coupled to the output of the multiplexers to add or subtract inputs to the arithmetic circuits;

second arithmetic circuits coupled to at least the 2-to-1 multiplexers; and two multi-bit 2-to-1 multiplexers coupled to the second arithmetic circuits, wherein the multi-bit 2-to-1 multiplexers select signals for use by the DSP.

* * * * *